(12) United States Patent
Takeo (10) Patent No.: US 7,162,061 B1
(45) Date of Patent: Jan. 9, 2007

(54) ABNORMAL PATTERN DETECTION PROCESSING METHOD AND SYSTEM

(75) Inventor: Hideya Takeo, Kaisei-machi (JP)

(73) Assignee: Fuji Photo Film Co., Ltd., Kanagawa-ken (JP)

(*) Notice: Subject to any disclaimer, the term of this patent is extended or adjusted under 35 U.S.C. 154(b) by 0 days.

(21) Appl. No.: 09/489,846

(22) Filed: Jan. 24, 2000

(30) Foreign Application Priority Data

Jan. 22, 1999 (JP) ................................. 11-014577
Nov. 12, 1999 (JP) ................................. 11-322707

(51) Int. Cl.
*G06K 9/00* (2006.01)
(52) U.S. Cl. ........................ 382/128; 382/131; 382/132
(58) Field of Classification Search ................ 382/128, 382/131, 132; 378/37; 128/922
See application file for complete search history.

(56) References Cited

U.S. PATENT DOCUMENTS

| | | | | |
|---|---|---|---|---|
| 5,133,020 A | * | 7/1992 | Giger et al. ................. | 382/128 |
| 5,583,346 A | * | 12/1996 | Nakajima .................... | 250/587 |
| 5,761,334 A | | 6/1998 | Nakajima et al. ........... | 382/132 |
| 5,924,074 A | * | 7/1999 | Evans ........................... | 705/2 |
| 6,317,617 B1 | * | 11/2001 | Gilhuijs et al. ............. | 128/922 |
| 2002/0081006 A1 | * | 6/2002 | Rogers et al. .............. | 382/128 |

FOREIGN PATENT DOCUMENTS

JP 10-233815 9/1998

OTHER PUBLICATIONS

Fields et al., Clinical Evalution of Computerized Enhancement and Analysis of Mammographic Findings, 1996, Elsevier, Digital Mammography '96, pp. 81-86.*
"Detection Method of Malignant Tumors in DR Images-Iris Filter", Electronics Information Communication Society, D-II vol. J75-D-II No. 3, pp. 663-670, Mar. 1992.
"Extraction of Microcalcifications on Mammogram Using Morphological Filter with Multiple Structuring Elements", Electronics Information Communication Society, D-II vol. J75-D-II No. 7, pp. 1170-1175, Jul. 1992.

* cited by examiner

*Primary Examiner*—Bhavesh M. Mehta
*Assistant Examiner*—Patrick L. Edwards
(74) *Attorney, Agent, or Firm*—Sughrue Mion, PLLC (57) ABSTRACT

The result of detection processing by abnormal pattern detection processor means 30 is stored in a server 40. In addition, the output image on an image output device 440 is read for pattern, and the supporting contents, such as the result of judgment by a doctor (which, when differing from the result of detection processing, corresponds to the corrected result), the comment, and the assessment category, are stored in the server 40 in conformity with the BI-RADS proposed by the ACR. The result of pathologic assessment corresponding to the abnormal pattern is related to the supporting contents and stored in the server 40. The statistical processing in conformity with the follow-up method of the BI-RADS is performed to find the specificity, the cancer detection rate, etc.

8 Claims, 9 Drawing Sheets

[PATIENT INFORMATION]
① PATIENT'S NAME, AND PATIENT'S ID
② PATIENT'S DATE OF BIRTH (YEARS OLD)
③ NAME OF CLINICIAN IN CHARGE
④ NAME OF RADIOLOGIST (REPORTER)

[BREAST COMPOSITON]
1. BRIEF DESCRIPTION OF OVERVIEW OF ENTIRE MAMMOGRAM
   ① FAT (GENERALLY FAT/ADIPOSE)
   ② FIBROGIANDULAR (DISTRIBUTED AT SPARSE DENSITY)
   ③ HETEROGENEOUSLY (HETEROGENEOUSLY THICKSET)
   ④ DENSE
2. DETECTION RESULT
   a-MASS
      a-1 SIZE
      a-2 GEOMETRY/DENSITY
      a-3 EXISTENCE OF CALCIFICATION
      a-4 ASSOCIATED FINDINGS
      a-5 LOCATION
   b-CALCIFICATIONS
      b-1 GEOMETRY
      b-2 DENSITY
      b-3 ASSOCIATED FINDINGS
      b-4 LOCATION
   c-ARCHITECTURAL DISTORTION
      c-1 EXISTENCE OF CALCIFICATION
      c-2 ASSOCIATED FINDINGS
      c-3 LOCATION
   d-SPECIAL CASES
      c-1 EXISTENCE OF CALCIFICATION
      c-2 ASSOCIATED FINDINGS
      c-3 LOCATION

* WHEN A PAST IMAGE IS AVAILABLE, RECORD WHAT CHANGE OCCURS.
   * WHEN THE NIPPLE IS REGARDED AS THE CENTER OF A CLOCK, INDICATE
     THE DIRECTION WHAT O'CLOCK THE LOATION IS IN.
3. DESCRIPTION OF GENERAL IMPRESSION (SUMMARY)

[ASSESSMENT CATEGORIES]
IN ACCORDANCE WITH THE FOLLOWING CATEGORIES (WHICH ARE CALLED BI-RADS ™
CATEGORIES), THE RADIOLOGIST SHALL INDICATE THE RESULT OF PATTERN READING.
CATEGORY 0: NEED ADDITIONAL IMAGE EVALUATION.
CATEGORY 1: NEGATIVE--THERE IS NOTHING TO BE COMMENTED.
CATEGORY 2: BENIGN FINDING.
CATEGORY 3: PROBABLY BENIGN FINDING--NEED SHORT TERM FOLLOW-UP.
CATEGORY 4: THERE IS HIGH POSSIBILITY OF MALIGNANCY. SUSPICIOUS
ABNORMALITY--NEED FOR BIOPSY TO BE EXAMINED.
CATEGORY 5: MALIGNANT. HIGH SUGGESTIVE OF MALIGNANCY--AN APPROPRIATE
MEASURE TO BE TAKEN.

FIG.4

Hanako Yamada
DOB : 11 / 5 / 43
Referring Physician : Ichiroh Fuji

BILATERAL SCREENING MAMMOGRAMS

March 1, 1998

Clinical History : Screen.

Compared with the prior study of 2 / 1 / 97, there are again scattered fibroglandular densities bilaterally.

IMPRESSION :
No change from prior examination. No mammographic evidence of malignancy. Yearly mammograms are recommended.

BI-RADS ™ CATEGORY 1 :
Negative.

Taroh Tokyo
Radiologist

FIG.5

DETACHABLE REFERENCE FOR BIOPSY RESULTS

BIOPSY RESULTS

|  | POSITIVE (BIOPSY DEMONSTRATED MALIGNANCY) | NEGATIVE (BIOPSY IS BENIGN OR NO CANCER DISCOVERED WITHIN ONE YEAR) |
|---|---|---|
| MAMMOGRAM POSITIVE (BI-RADS™ CATEGORIES 0, 4, 5) | TP | FP |
| MAMMOGRAM NEGATIVE (BI-RADS™ CATEGORIES 1, 2, 3) | FN | TN |

SCREENING TEST FOR CANCER

SENSITIVITY = TP/(TP+FN)
SPECIFICITY = TN/(TN+FP)
PPV = TP/(TP+FP)

FIG. 6

SAMPLED DATA COLLECTION

BASIC CLINCIAL RELEVANT AUDIT, SCREENING CASES ONLY

FORM A

| DATA ITEM | RESULTS |
|---|---|
| #1 TOTAL SCREENING CASES | |
| #2 TOTAL SCREENING CASES, ASSESSMENT BI-RADS ™ CATEGORY 0, (NEEDS ADDITIONAL IMAGING EVALUATION) AND SCREENING CASES GIVEN ASSESSMENT BI-RADS ™ CATEGORY 4 OR 5, WITHOUT FURTHER EVALUATION | |
| #3 TOTAL SCREENING CASES, FINAL ASSESSMENT BI-RADS™ CATEGORY 4 | |
| #4 TOTAL SCREENING CASES, FINAL ASSESSMENT BI-RADS™ CATEGORY 5 | |
| #5 TOTAL CASES FROM FINAL ASSESSMENT BI-RADS ™ CATEGORIES 4 AND 5 THAT UNDERWENT CORE BIOPSY/FNA | |
| #5A NUMBER OF THESE THAT WERE MALIGNANT | |
| #5B NUMBER OF THESE THAT WERE BENIGN | |
| #6 TOTAL CASES FROM FINAL ASSESSMENT BI-RADS ™ CATEGORIES 4 AND 5 THAT UNDERWENT SURGICAL BIOPSY | |
| #6A NUMBER OF THESE THAT WERE MALIGNANT | |
| #6B NUMBER OF THESE THAT WERE BENIGN | |
| #7 TOTAL CASES FROM FINAL ASSESSMENT BI-RADS ™ CATEGORIES 4 AND 5 THAT WERE LOST TO FOLLOW-UP, REFUSED BIOPSY, OR SURGEON ELECTED TO FOLLOW RATHER THAN BIOPSY | |
| #8 TOTAL CANCERS FOUND THAT WERE DUCTAL CARCINOMA IN SITU | |
| #9 TOTAL CANCERS FOUND THAT WERE INVASIVE DUCTAL CARCINOMA OR INVASIVE LOBULAR CARCINOMA | |
| #10 TOTAL CANCERS FOUND THAT WERE INVASIVE DUCTAL CARCINOMA OR INVASIVE LOBULAR CARCINOMA FOR WHICH AXILLARY SAMPLING WAS PERFORMED | |
| #11 TOTAL NUMBER OF INVASIVE CANCERS THAT WERE $\leq$ 1cm IN SIZE | |
| #12 TOTAL NUMBER OF INVASIVE CANCERS THAT SHOWED POSITIVE AXILLARY LYMPH NODES AT SURGERY | |

NOTE : BI-RADS™ CATEGORY 3 CASES ARE NOT LISTED HERE BECAUSE THEY ARE CONSIDERED NEGATIVE.

FIG. 7

SAMPLE CALCULATION (DERIVED DATA)

BASIC CLINCIAL RELEVANT AUDIT, SCREENING CASES ONLY
FORM B

| PARAMETER TO BE CALCULATED | EQUATION* | RESULT |
|---|---|---|
| NUMBER OF TRUE POSITIVE (TP) | 5A+#6A | |
| NUMBER OF FALSE POSITIVES (FP) THREE DEFINITIONS: | | |
| $FP_1$ | #2-TP | |
| $FP_2$ | #5B+#6B+#7 | |
| $FP_3$ | #5B+#6B | |
| POSITIVE PREDICTIVE VALUE THREE DEFINITIONS: | | |
| $PPV_1$ (HOW OFTEN ABNORMAL SCREENS ARE CANCER) | [TP]/#2 | |
| $PPV_2$ (HOW OFTEN BIOPSIES RECOMMENDED ARE CANCER) | [TP]/[TP+FP2] | |
| $PPV_3$ OR BPR (HOW OFTEN BIOPSIES DONE ARE CANCER) | [TP]/[TP+FP3] | |
| CANCER DETECTION RATE | ([TP]/[#1])×1000 | |
| PERCENT MINIMAL CANCERS (INVASIVE CANCERS ≤ 1cm, OR DUCTAL CARCINOMA IN SITU) FOUND | ([#8+#11]/[TP])×100 | |
| PERCENT AXILLARY NODE-POSITIVE INVASIVE CANCER FOUND | (#12I/[#0])×100 | |
| % RECALL (i.e. RECALL RATE) | ([#2]/[#1])×100 | |

* NUMBER REFER TO DATA ITEMS ON FORM A

FIG.8

PRACTICE DATA SET FOR FORMS A AND B

PLEASE USE THE FOLLOWING HYPOTHETICAL DATA SET FOR FORM A AS A PRACTICE EXERCISE FOR PERFORMING THE REQUISITE CALCULATIONS OF FORM B FOR THE BASIC AUDIT.

| | |
|---|---|
| 1. | 5000 |
| 2. | 450 |
| 3. | 50 |
| 4. | 40 |
| 5. | 43 |
| 5A. | 15 |
| 5B. | 28 |
| 6. | 42 |
| 6A. | 15 |
| 6B. | 27 |
| 7. | 5 |
| 8. | 6 |
| 9. | 24 |
| 10. | 23 |
| 11. | 9 |
| 12. | 4 |

ANSWERS TO CATEGORIES ON FORM B:
TP=30
$FP_1$=420
$FP_2$=60
$FP_3$=55
$PPV_1$=.07(7%)
$PPV_2$=.33(33%)
$PPV_3$=.35(35%)
CANCER DETECTION RATE=6/1000
% MINIMAL CANCERS=50%
%NODE POSITIVE INVASIVE CANCERS=17%
RECALL RATE=9%

FIG.9

ABNORMAL PATTERN DETECTION PROCESSING METHOD AND SYSTEM

BACKGROUND OF THE INVENTION

1. Field of the Invention

The present invention relates to an abnormal pattern detection processing method and system, and particularly, to a computer-aided type of abnormal pattern detection processing method and abnormal pattern detection processing system which, on the basis of image data representing a radiation image of a subject, detects and processes an abnormal pattern in the radiation image, and, when it is determined that an abnormal pattern exists, displays an image of the affected part zone including this abnormal pattern to supply it for assessment.

2. Description of the Prior Art

Up to now, reading a radiation image of a subject recorded on an accumulative fluorescent material sheet or film to obtain image data, and after providing an appropriate image process for this image data, generating the image by use of a display device, etc. have been performed in a variety of fields, such as the medical field. Particularly, in recent years, digital image processing technology has been developed in combination with computers, and the CT (Computed Tomology) device, the MRI (Magnetic Resonance Imaging) device, the CR (Computed Radiography) device and various other image forming modalities (image input devices) have been in widespread use as devices for forming images for assessment, etc.

With the popularization and advance of network technology, in the medical field, for example, it is being realized to construct a medical image network for assessment with which a variety of image forming modalities installed in the audit room, etc. in a hospital are connected by network to image output devices, such as an image display device (such as a CRT and a liquid crystal display) and a printer (including a laser printer (LP)), installed in a medical examination and treatment room, a research laboratory, etc., which allows image information for assessment acquired with an image forming modality in the audit room to be obtained in the medical examination and treatment room without leaving it. Further, it has been proposed to provide, on such a medical image network for assessment, a workstation for quality assurance (hereafter called QAWS (Quality Assurance Workstation)) which collectively control the image information acquired with the above-mentioned various image forming modalities, the image information obtained by providing a variety of image processes for this image information to improve the assessment performance, etc.

Incidentally, the above-stated digital image processing technology has features which are essentially different from those of the conventional analog type in that it can quantitatively analyze the image data. For example, the abnormal pattern detection processing technology known as computer-aided image assessment or CADM (Computer Aided Diagnosis of Medical Image), which is intended to more positively utilize the features of this digital image processing technology for medical assessment of human bodies, has been proposed (refer to "Detection Method of Malignant Tumors in DR Images—Iris Filter", Electronics Information Communication Society article magazine, D-II Vol. J75-D-II No. 3p. 663 to 670, March, 1992, "Extraction of Microcalcifications on Mammogram Using Morphological Filter with Multiple Structuring Elements", the same magazine, D-II Vol. J75-D-II No. 7 p. 1170 to 1176, July, 1992, etc.).

This abnormal pattern detection processing technology uses a computer to detect, on the basis of the image data representing a radiation image, an abnormal tumor pattern indicating a cancer or the like, or an abnormal pattern candidate which can be considered as a high-density minute calcification pattern or the like (hereafter these are generically called an abnormal pattern), and provides a marking for the detected portion to attract the attention of a pattern reader (for example, a radiologist) who observes the radiation image to read the pattern, or quantitatively offers the distinctive one of the abnormal pattern candidates detected as useful data for objective judgment of the pattern reader, thus preventing oversight due to the difference in pattern reading capability of the pattern reader, and misunderstanding due to subjective judgment, thereby improving the assessment performance.

The present applicant has proposed an abnormal pattern detection processing system (a computer-aided image assessment device) (Japanese Unexamined Patent Publication No. 8 (1996)-294479, Japanese Unexamined Patent Publication No. 8 (1996)-287230, etc.) which, for mammograms, chest images, etc., uses a computer to automatically detect and process an abnormal pattern suggesting the existence of a breast cancer or other cancer with abnormal pattern detection processor means employing an iris filter or a morphology filter, and overlays, on part of the entire image, an image with which the detected abnormal pattern is highlighted, enlarged, or otherwise processed, thus outputting an image providing a high assessment performance suitable for pattern reading.

The present applicant has also proposed an abnormal pattern detection processing system which is well suited for configuring abnormal pattern detection processing as a device independent of the QAWS and constructing a network (Japanese Unexamined Patent Publication No. 2000-126163). This abnormal pattern detection processing system comprises an image selector means which selects, among the items of image information which are inputted from an image input device equivalent to the above-mentioned image forming modality, being provided with supplementary information which allows identification of the type of subject and the patient. The image information concerns a particular type of subject which is to be an object of abnormal pattern detection processing by the abnormal pattern detection processor means. The image selector means outputs the supplementary information. The abnormal pattern detection processing system also comprises an input monitor means which, when an item of image information concerning a subject which is to be an object of abnormal pattern detection processing is inputted from the image selector means, monitors that all the other items of image information concerning the same subject for the same patient which are to provide a set with the item of image information concerning the subject which is to be an object are inputted from the image selector means. When having detected that all the items of image information have been inputted, the input monitor means causes collective inputting of all these items of abnormal pattern detection processing object image information concerning the same subject for the same patient to the abnormal pattern detection processor means. With this configuration, an automatic routing function is provided which, from a number of and a variety of items of image information inputted in the random order, automatically searches out and collects the items of image information which provide a set for each particular patient, thus eliminating the need for manual operation by the operator to select and output the items of image information to be outputted to the abnormal pattern detection processor means.

However, none of the above-stated proposals for abnormal pattern detection processing provides any more than abnormal pattern detection processing, output processing, and automatic routing processing, and is effective for automatic detection of abnormal patterns, improvement of the observing and pattern reading performance for images of the affected part zones including an abnormal pattern which is an object of assessment, or prevention of erroneous operation by the operator, delayed output of an abnormal pattern, etc. However, for automatic checking for the specificity, the cancer detection rate, etc., enhancing the pattern reading level, and providing contribution to improvement of the performance of assessment, there is a need to link the pattern reading reports having a comment of the pattern readers about the mammograms, etc. (hereafter a system to prepare a pattern reading is called a reporting system) to the algorithm for detection processing, etc. to provide a database for pattern reading reports, detection results, etc. which is well suited for statistical processing.

A first abnormal pattern detection processing method according to the present invention is an abnormal pattern detection processing method which, on the basis of inputted image information, detects and processes an abnormal pattern in an image represented by the image information, in which, for each of a plurality of items of the image information, the result of the detection processing is related to the corrected result after correcting the result and stored.

With this first abnormal pattern detection processing method, on the basis of the stored plurality of results of detection processing and corrected results, quantitative evaluation of the performance of the detection processing can be performed.

A second abnormal pattern detection processing method according to the present invention is an abnormal pattern detection processing method which, on the basis of inputted image information, detects and processes an abnormal pattern in an image represented by the image information, in which, for each of a plurality of pieces of the image information, the result of the detection processing and the result of pattern reading assessment which has been obtained by pattern reading assessment using the image information are related to the result of pathologic assessment concerning the abnormal pattern and stored.

With this first abnormal pattern detection processing method, on the basis of the stored plurality of results of pattern reading assessment and results of pathologic assessment, quantitative evaluation of the performance of the pattern reading assessment can be performed.

A first abnormal pattern detection processing system according to the present invention is a system realizing the above-stated first abnormal pattern detection processing method, i.e., an abnormal pattern detection processing system which, on the basis of inputted image information, detects and processes an abnormal pattern in an image represented by the image information, comprising memory means which, for each of a plurality of items of image information, relates the result of the detection processing to the corrected result after correcting the result and stores them.

It is preferable that this first abnormal pattern detection processing system further comprise evaluator means which reads out the plurality of results of detection processing and corrected results stored in the memory means, and on the basis of these results read out, performs quantitative evaluation of the performance of the detection processing.

A second abnormal pattern detection processing system according to the present invention is a system realizing the above-stated second abnormal pattern detection processing method, i.e., an abnormal pattern detection processing system which, on the basis of inputted image information, detects and processes an abnormal pattern in an image represented by the image information, comprising memory means which, for each of a plurality of items of image information, relates the result of the detection processing and the result of pattern reading assessment which has been obtained by pattern reading assessment using the image information to the result of pathologic assessment concerning the abnormal pattern and stores them.

It is preferable that this second abnormal pattern detection processing system further comprises evaluator means which reads out the plurality of results of pattern reading assessment and results of pathologic assessment stored on the memory means, and on the basis of these results read out, performs quantitative evaluation of the performance of the pattern reading assessment.

The phrase "detects and processes an abnormal pattern in an image represented by the image information" in the above-stated method and system refers to processing which detects an abnormal pattern in an image, and on the basis of the result of the detection, automatically determines whether an abnormal pattern exists or not, and as disclosed in the above-mentioned Japanese Unexamined Patent Publication No. 8 (1996)-294479 and Japanese Unexamined Patent Publication No. 8 (1996)-287230, it refers to such processing as that which, for mammograms, chest images, etc., automatically detects the existence of calcification (giving a style of abnormal pattern) suggesting the existence of a breast cancer or other cancer and makes determination.

Here, the phrase "an abnormal pattern" means an image representing an abnormal condition of the subject, referring to, for the chest X-ray image, mammogram, etc. for medical applications, for example, a pattern showing a symptom, such as those of tumor, calcification, thickening or pneumothorax of pleura, cancer, etc., which cannot be recognized with a normal pattern of a blood vessel or the like. In detecting and processing abnormal patterns, all of these abnormal patterns need not be detected, but only the tumor pattern or only the calcification pattern, for example, may be detected and processed as an abnormal pattern, and two or more of these abnormal patterns may be detected and processed. For example, when the detection processing of abnormal patterns is by processing based on the algorithm which utilizes an iris filter to detect, as an abnormal pattern, an image portion where the image has a high concentration of density gradient (hereafter simply called iris filter processing), the abnormal pattern is a tumor pattern, and when the detection processing of abnormal patterns is by processing based on the algorithm for the morphology which detects, as an abnormal pattern, an image portion where the density varies in the range spatially narrower than the multiple structure element used by the detection processing (hereafter simply called morphology filter processing), the abnormal pattern is a calcification pattern.

The image may include not only a true abnormal pattern, but also a pattern similar to an abnormal pattern, in other words, an abnormal pattern candidate, which shows features similar to those of a tumor, calcification, etc. from the viewpoint of the image features of a tumor, calcification, etc., and which is therefore not definitely an abnormal pattern, and requires final judgment by the pattern reader. In this specification, the phrase "detects and processes an abnormal pattern" refers to detection processing of not only a true abnormal pattern, but also such an abnormal pattern candidate.

The phrase "the result of the detection processing" means the result of detection processing the above-mentioned abnormal pattern, which must include at least the result of automatic detection of the existence or absence of an abnormal pattern or its candidate by the abnormal pattern detection processor means. It is more preferable that the result include not only the result of detection of the existence or absence of calcification, etc., but also the contents of the items other than "existence of calcification" in the "detection result" in the BI-RADS reporting system later described.

The phrase "the corrected result after correcting the result" means the result where the pattern reader, such as a radiologist, has carried out pattern reading assessment of an image (for example, an image of the affected part zone including an abnormal pattern) outputted to the image output means, and determined whether the result of the abnormal pattern having been detected and processed is correct or not, and when the result of the detection processing (the automatic detection processing) is not correct and the result of the detection processing has been corrected, at least the result after the correction is included.

Here, the phrase "an image of the affected part zone including an abnormal pattern" means the vicinity including at least an abnormal pattern or an abnormal pattern candidate, and as the peripheral shape, an appropriate one of a variety of shapes, such as a rectangle, a circle, and an ellipse, can be adopted. The phrase "at least" in the "at least an abnormal pattern or an abnormal pattern candidate" means that part of the detected abnormal pattern or the like may be included, i.e., the entire abnormal pattern or the like need not always be included, and, further the shape may be that created by tracing the periphery of the abnormal pattern or the like.

In outputting "an image of the affected part zone including an abnormal pattern" on the image output means, not only the abnormal pattern or the like itself, but also an image of the vicinity zone is displayed. In other words, it is preferable to output a combination of the abnormal pattern or the like with the original image. By doing this, the whole can be easily conceived from the outputted image, and the abnormal pattern or the like can be easily positioned in the entire image. Particularly, assuming that the abnormal pattern detection processor means outputs a combination of the abnormal pattern with the original image, these images can be outputted, being automatically laid out in accordance with the predetermined layout, or the layout requirements are inputted from the terminal provided, being attached to the image output device, and these images can be outputted, being laid out with the layout requirements being met.

As the style of image layout, an appropriate one of the well-known styles, such as a style in which the original image and the abnormal pattern are each display-outputted on one display screen or one output medium in the form of multi-window; a style in which the original image and the abnormal pattern are display-outputted, being overlaid one upon the other in a single window; and a style in which a plurality of images which are to provide a set (for example, right and left mammograms) are display-outputted on one display screen or one output medium in the form of multi-window can be adopted. In creating the layout, it is more preferable to adopt a style in which an image highlighted, enlarged or otherwise processed for the abnormal pattern is display-outputted, being overlaid on part of the entire image.

The phrase "the result of pathologic assessment concerning the abnormal pattern" means the result of the actual assessment of the abnormal pattern or the candidate area by, for example, palpatory audit or other examination by a clinician, affected part audit by use of a diagnostic needle, a biological method, such as blood test, or the like.

The phrase "performs quantitative evaluation of the performance of the detection processing" refers to finding an index which indicates the certainty of the detection processing, particularly, a quantitative index which can contribute to improvement of the performance of the detection processing (for example, making statistical processing) by comparing the results of detection processing for a number of patients and subjects with the corrected results.

The phrase "performs quantitative evaluation of the performance of the pattern reading assessment" refers to finding an index which indicates the certainty of the pattern reading assessment, particularly, a quantitative index which can contribute to improvement of the pattern reading level (for example, making statistical processing) by comparing the results of pattern reading assessment for a number of patients and subjects with the results of pathologic assessment.

For the above-stated methods and systems, it is preferable that the detection result, the corrected result, the result of pattern reading assessment, and the result of pathologic assessment be prepared and stored in conformity with BI-RADS (a US registered trademark). Here, "BI-RADS" (Breast Imaging Reporting And Data System) is the mammogram pattern reading standard system recommended by the ACR (American College Radiology) which is intended to improve the performance of the mammogram pattern reading assessment, make the mammogram pattern reading objective, and construct a data base, comprising the mammogram pattern reading method (classification method), the reporting system, the follow-up method (for pattern reading checking by comparing the mammogram assessment with the biopsy), and the data base (NMD (National Mammography Database)) creation method.

With the above-mentioned reporting system, it is recommended that, as the reporting contents, entry be made about three items; Patient Information, Breast Composition (Brief Description of Overview of Entire Mammogram, Detection Result, and Summary), and Assessment Categories. It is also recommended that comparison with past images (mammograms) be included whenever possible.

As the above-mentioned follow-up method, the method which compares the mammogram assessment report (one of the categories 0 to 5 of the BI-RADS) with the result of the pathologic assessment by biopsy (the BIOPSY RESULT) to check (follow-up) the mammogram pattern reading is given. As a technique, by describing the reporting contents on the basis of the above-stated reporting system, the numbers of occurrences of TP (True Positive), FP (False Positive), FN (False Negative) and TN (True Negative), the Sensitivity, and the Specificity are found in accordance with the specified formats (FORM A and FORM B), and thus the cancer detection rate, the specificity, etc. can be known.

The above-stated database (NMD) creating method is the data base construction method proposed by the ACR which is intended to be used for such applications as research with the use of the mammogram data, aftercare of the patient, and access to past images. Specifically, it is recommended that the contents be recorded/stored about 122 items in total, being classified into six data base record formats (details omitted). The NMD Data Collection which records only the critical items among the 122 items is given.

With the above-mentioned reporting system, as the abnormal pattern detection processor means for detection processing of abnormal pattern or its candidate, abnormal pattern detection processor means which performs iris filter processing to detect, as an abnormal pattern, an image portion where the image has a high concentration of density gradient, abnormal pattern detection processor means which performs morphology filter processing to detect, as an abnormal pattern, an image portion where the density varies in the range spatially narrower than the multiple structure element used, or the like, as disclosed in the above-mentioned Japanese Unexamined Patent Publication No. 8 (1996)-294479, Japanese Unexamined Patent Publication No. 8 (1996)-287230, or the like can be used.

The abnormal pattern detection processor means may be configured as a device independent of the QAWS or constructed as a device well suited for constructing a network (refer to Japanese Unexamined Patent Publication No. 2000-126163). Specifically, as stated in Japanese Unexamined Patent Publication No. 2000-126163, it is recommended that the abnormal pattern detection processing system comprise image selector means which selects, among the items of image information which are inputted from an image input device, being provided with supplementary information which allows identification of the type of subject and the patient. The image information concerns a particular type of subject which is to be an object of abnormal pattern detection processing by the abnormal pattern detection processor means. The image selector means outputs the supplementary information. The input monitor means which, when an item of image information concerning a subject which is to be an object of abnormal pattern detection processing is inputted from the image selector means, monitors that all the other items of image information concerning the same subject for the same patient which are to provide a set with the item of image information concerning the subject which is to be an object are inputted from the image selector means. When having detected that all the items of image information have been inputted, the input monitoring means causes collective inputting of all these items of abnormal pattern detection processing object image information concerning the same subject for the same patient to the abnormal pattern detection processor means.

As the memory means, any type may be used so long as it can relate the result of detection to the corrected result, or the result of detection and the result of pattern reading assessment to the result of pathologic assessment and storing them. From the viewpoint of the necessity for storing a number of items of patient information and creating a data base, it is preferable to use a large capacity hard disk, an optical disk, or the like.

As the evaluator means, any type may be used so long as it can perform quantitative evaluation of the performance of the detection processing on the basis of the results of detection processing and the corrected results, or perform quantitative evaluation of the performance of the pattern reading assessment on the basis of the results of pattern reading assessment and the results of pathologic assessment. It is preferable to use a computer-aided type evaluator which comprises a CPU incorporating programs for making such quantitative evaluation, and peripheral circuitry. The evaluator means may, of course, be supplied as a memory medium, such as a CD-ROM, which records programs for quantitative evaluation.

The image input device includes a variety of image forming modalities, such as a CT device, an MRI device, and a CR device, and in addition to these, a memory to store image information, etc. The image output device includes image display devices (such as a CRT, and a liquid crystal display), printers (including a laser printer (LP), such as a laser imager), etc. These image input device and image output device may be connected to a network, such as a medical image network.

With the first abnormal pattern detection processing method and system according to the present invention, for each of the plurality of items of image information (for example, for a number of patients), the result of the detection processing is related to the corrected result after correcting the result and stored, and therefore, by later comparing the results of detection processing with the corrected results, the certainty of the detection by automatic detection processing can be found by statistical processing, which allows improvement of the detection processing algorithm, etc. to provide a higher specificity for the automatic detection processing. If evaluator means for quantitative evaluation of the performance of the detection processing is provided, the above-mentioned statistical processing can be automatically made for extreme convenience.

With the second abnormal pattern detection processing method and system according to the present invention, for each of the items of image information for a number of patients, the result of the detection processing and the result of pattern reading assessment which has been obtained by pattern reading assessment using the image information are related to the result of pathologic assessment concerning the abnormal pattern and stored, and therefore, by later comparing the results of detection processing and pattern reading assessment with the results of pathologic assessment, the cancer detection rate, the specificity, etc. can be found by statistical processing, which allows the performance of cancer assessment by a doctor or an institution to be known, and this result to be utilized for providing a higher level of pattern reading. If evaluator means for quantitative evaluation of the performance of the detection processing is provided, the above-mentioned statistical processing can be carried out automatically for extreme convenience.

SUMMARY OF THE INVENTION

The purpose of the present invention is to offer an abnormal pattern detection processing method and system which can statistically process the specificity and the cancer detection rate.

BRIEF DESCRIPTION OF THE DRAWINGS

FIG. 3 is a chart giving the items in detail for the reporting contents.

DESCRIPTION OF THE PREFERRED EMBODIMENTS

Hereinbelow, embodiments of the abnormal pattern detection processing method and system according to the present invention will be explained with reference to the drawings.

Figure 1:
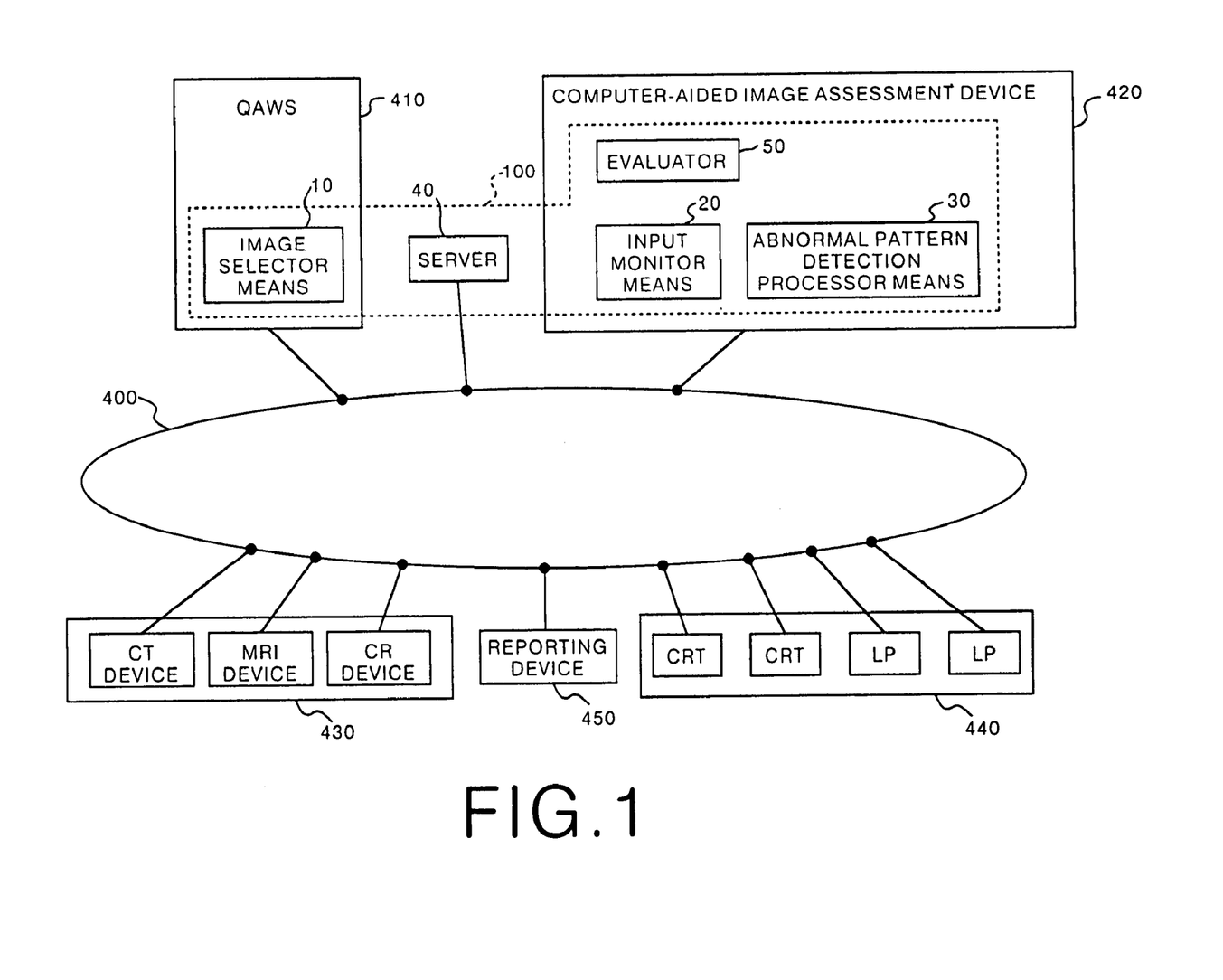
FIG. 1 is a diagram illustrating an embodiment (a style with network connection) of the abnormal pattern detection processing system of the present invention.

FIG. 1 is a diagram illustrating an embodiment of the system realizing the abnormal pattern detection processing method according to the present invention using an example in which it is connected to a medical image network for assessment (hereafter simply called a network).

To a network 400 as shown in the figure, a CT device, an MRI device, and a CR device are connected as an image input device 430, and CRTs and laser printers are connected as an image output device (image display means) 440. In addition, to this network 400 are connected a QAWS 410 to which all the items of image information inputted to the network 400 from the image input device 430 are inputted and which stores and keeps all these items of image information for collective control; a computer-aided image assessment device 420 which performs a variety of automatic assessments on the basis of the inputted image information; a reporting device to which a pattern reading report representing a comment as a result of reading an image outputted to the image output device 440; and a server (large-capacity hard disk) 40 as memory means which stores the result of detection processing in an abnormal pattern detection system 100 (later described) and information (a pattern reading report) inputted from the reporting device 450, relating them to each other.

The abnormal pattern detection system 100 as shown in the figure comprises image selector means 10, input monitor means 20, abnormal pattern detection processor means (abnormal pattern detection means) 30, a server 40, and evaluator means 50. The QAWS includes the image selector means 10 constituting the abnormal pattern detection system 100, and the computer-aided image assessment device 420 includes the input monitor means 20, the abnormal pattern detection processor means 30, the server 40, and the evaluator means 50 constituting the abnormal pattern detection system 100.

With the image selector means 10, among the items of image information which are inputted from the image input device 430 to the QAWS 410 to be stored and kept, being provided with supplementary information which allows identification of the type of subject and the patient, only the image information concerning a particular type of subject which is to be an object of abnormal pattern detection processing by the abnormal pattern detection processor means is selected on the supplementary information, and the selected image information is outputted to the input monitor means 20 through the network 400, while the image information other than the object image information is outputted to the image output device 440 (such as a CRT display).

Here, "the image information concerning a particular type of subject which is to be an object of abnormal pattern detection processing" means the radiation image information (regardless of whether the radiation is transmission radiation or self-emitting radiation) concerning a subject, particularly, the radiation image information concerning a subject for which a plurality of images are generally screened simultaneously (meaning "at one audit") for a given patient. For example, it is image information representing mammograms or chest images, etc., with which a plurality of images (for example, two or four) are generally screened simultaneously for the same patient.

"The supplementary information" means information representing the type of subject (portion of a human body such as head, chest, abdominal cavity, breast, neck, and limbs), the screening position (the direction toward the front, a side or the like), and the method of screening (simple screening, tomography screening, contrastradiogram screening or the like), ID information for identifying the patient, information indicating the date of screening, etc.

When an item of image information concerning a subject which is to be an object of abnormal pattern detection processing is inputted from the image selector means 10, the input monitor means 20 monitors that all the other items of image information concerning the same subject for the same patient which are to provide a set with the item of image information concerning the subject which is to be an object are inputted from the image selector means 10, and, when having detected that all the items of image information have been inputted, causes collective inputting of all these inputted items of abnormal pattern detection processing object image information concerning the same subject for the same patient to the abnormal pattern detection processor means 30.

Here, "all the other items of image information concerning the same subject for the same patient which are to provide a set with the image information concerning the subject which is an object of abnormal pattern detection processing" are such that, when the image information concerning the subject is a mammogram, for example, two images, i.e., a plan image and a side image, are generally screened for each of the right and left breasts at one audit, thus, for one patient, four items of image information compose a set of items of information. Therefore, after the first one mammogram has been inputted to the input monitor means, the remaining three mammograms correspond to "all the other items of image information". This is also true for the other subjects. For example, when, for a chest image, image information from the direction toward the front and image information from the direction toward a side provide a set, after one of these items of image information has been inputted, the other of them corresponds to "all the other items of image information".

Whether or not all the items of image information concerning the same subject for the same patient have been inputted to the input monitor means 20 can be determined on the basis of the supplementary information for the inputted image information while referring to, for example, a reference table or the like which is provided to store the number of items of information to be inputted for the same subject which is previously set depending upon the type of subject.

For mammography, for example, depending upon the contents of medical examination and treatment, image information only for either of the right and left breasts may be required (in such a case where the breast on one side has already been transected, and thus there is no need for screening for that side), resulting in not all of the above-mentioned four mammograms being required. In such case, if the input of the four mammograms is continued to be monitored, no image information for the mammograms which have not been taken will be inputted at all. In addition, there may occur a case where, for some cause, one or more of the items of image information which are to provide a set is not inputted at all. In these cases, if input of all the items of image information which are to provide a set is awaited, there is the possibility of an obstacle being caused to the subsequent processing, i.e., the processing of causing collective inputting of all the inputted items of abnormal pattern detection processing object image information concerning the same subject for the same patient to the abnormal pattern detection processor means 30.

Then, it is recommended that the input monitor means 20 be provided with a processing style in which, when, within the previously set time from the moment at which the first item of image information for a particular patient is inputted, the input of all the other items of image information concerning the same subject as that represented by the first item of image information for the patient has not been detected, the input of all the items of image information is regarded as detected, and only the items of abnormal pattern detection processing object image information which have been inputted are collectively inputted to the abnormal pattern detection processor means 30. By adopting such a style, the possibility of that the image information which is an object of abnormal pattern detection processing cannot be inputted to the abnormal pattern detection processor means 30 at all can be eliminated.

On the basis of the image information inputted from the image input device 430, the abnormal pattern detection processor means 30 detects and processes the abnormal patterns (a tumor pattern or a minute calcification pattern) in the radiation image represented by the image information, and outputs the detected abnormal patterns to the image output device 440, together with the original image, in the specified layout.

Figure 2A:
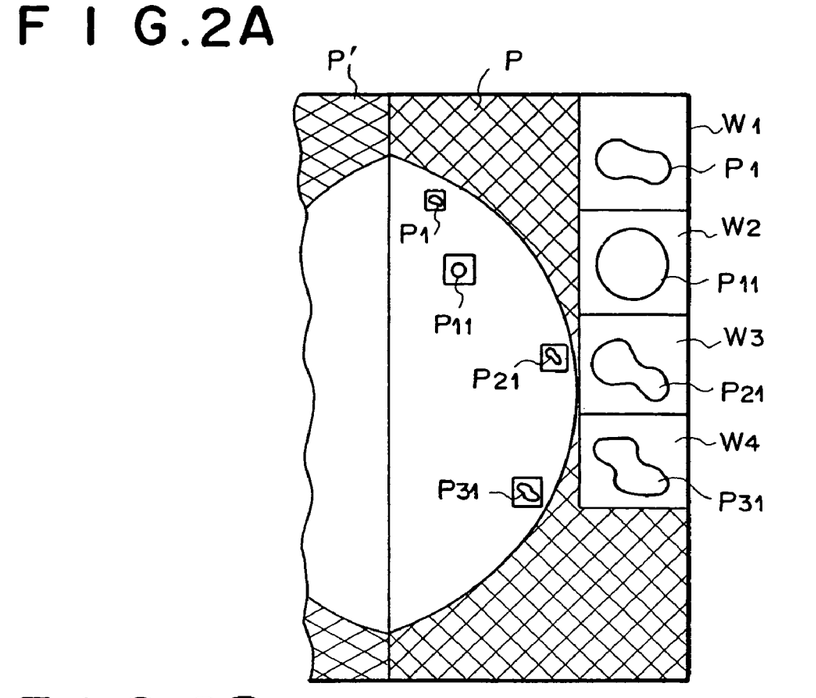
FIG. 2A and FIG. 2B are drawings giving examples of layout style display-outputted to an image output device.
Figure 2B:
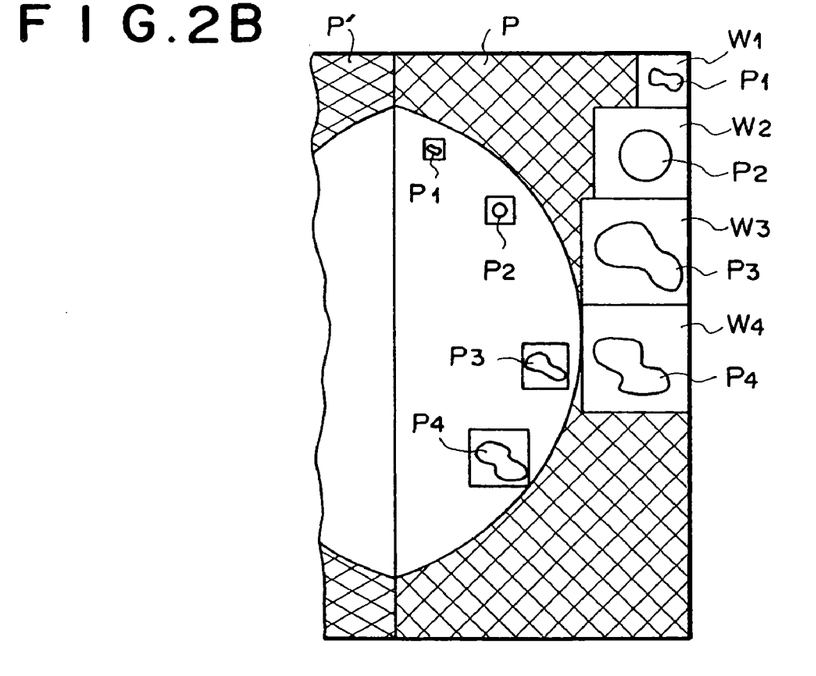

Here, as an output layout of the abnormal patterns detected by the abnormal pattern detection processor means 30 and the original image, a style in which images highlighted, enlarged or otherwise processed for the abnormal patterns are display-outputted, and overlaid on part of the entire image is adopted, as shown in FIG. 2A or FIG. 2B. In other words, it provides a layout with which, in the right half of the output screen for the image output device, the original image P for the right side breast and the enlarged views W1 to W4 of the affected part images corresponding to a plurality of abnormal pattern images P1, P11, P21, and P31, respectively, are displayed, while in the left half of the output screen, the original image P' for the left side breast and the abnormal pattern images are displayed (the left half is partly omitted), which is a style in which, as shown in FIG. 2A, the detected abnormal patterns are outputted, being overlaid on part of the entire image P, with the sizes of the enlarged views W1 to W4 of the affected part images being set so that they are all equal to one another, or which is a style in which, as shown in FIG. 2B, the detected abnormal patterns P1 to P4 are outputted, being overlaid on part of the entire image P, with the sizes of the enlarged views W1 to W4 of the affected part images being set so that they correspond to the respective sizes of the detected abnormal patterns P1 to P4.

The display output layout in this image output device 440 is not limited to this, and a layout style in which the original image (for example, that of an entire breast) is displayed as an entire image, while enlarged views of the affected part images comprising the abnormal patterns and their surrounding area images are overlaid on part of the entire image, or a layout style in which, in the right half of the display screen for the image output device, the original image of the right side breast and the abnormal pattern images are displayed, and, in the left half of the display screen for the image output device, the original image of the left side breast and the abnormal pattern images are displayed, with the abnormal pattern images being displayed, highlighted only in the entire image, or with the enlarged views of the affected part images being overlaid on part of the entire image, or various other known styles as disclosed in Japanese Unexamined Patent Publication No. 8 (1996)-294479) can, of course, be adopted.

As the evaluator means 50, that of a computer-aided type is used which incorporates a program for making quantitative evaluation of the performance of the detection processing on the basis of the result of automatic detection processing by the abnormal pattern detection processor means 30, and the result of correction of that result by the pattern reader, and a program for making quantitative evaluation of the performance of the pattern reading assessment on the basis of the result of pattern reading assessment by the pattern reader and the result of pathologic assessment such as biopsy.

Next, the functions of the abnormal pattern detection system 100 of the present embodiment will be explained by using, as an example, a case where the image information which is an object of abnormal pattern detection processing is a mammogram.

First, from the image input device 430 (such as a CR device), items of radiation image information representing many types of image are inputted to the image selector means 10 in the abnormal pattern detection system 100 through the network 400 in sequence, being accompanied by the respective items of supplementary information. The image selector means 10 reads the items of supplementary information among the items of image information inputted in sequence, and selects the mammograms, the subject information about which recorded in the supplementary information is a breast, and outputs the selected mammograms to the input monitor means 20. On the other hand, the image information other than the mammograms is outputted to the image output device 440 (such as a CRT display) requested for output through the network 400.

When the first mammogram (image information toward the front for the right breast) is inputted from the image selector means 10, the input monitor means 20 temporarily stores the inputted mammogram in the memory means (not shown), reading the ID information for the patient among the items of supplementary information for this mammogram.

For mammography, a set of four mammograms are generally taken, and so, the input monitor means 20 also reads the ID information for the other mammograms inputted in sequence from the image selector means 10 to monitor that the other three mammograms (for example, image information toward the side of the right breast, image information toward the front and image information toward the side of the left breast) for the same patient which have been taken (are estimated to have been taken) as a set with the stored mammogram are inputted from the image selector means 10. At the halfway stage, the other mammograms which are objects are temporarily stored in the memory means.

When the input monitor means 20 detects that all the four mammograms having the respective items of information with the same ID information have been inputted, it inputs these four mammograms in a batch to the abnormal pattern detection processor means 30.

The abnormal pattern detection processor means 30 detects and processes the abnormal patterns (a tumor pattern or a minute calcification pattern) in sequence for the inputted four mammograms. Then, it arranges the detected abnormal patterns and the original images in the layout as shown in FIG. 2A or FIG. 2B to output them to the image output device 440.

Through the above-stated series of functions, the image information is inputted to the network 400 from the image input device 430, and the abnormal patterns, etc. in the mammograms are displayed on the image output device 440, the preparation for pattern reading being now completed. Because this series of processing operations is automatically performed without the need for manual operation by the operator, erroneous operation by the operator resulting from the complexity of manual operation, delay of output of the abnormal patterns caused by an erroneous operation, etc. can be prevented, and the abnormal patterns can be conveniently supplied for routine pattern reading.

After the preparation for pattern reading having been thus completed, the pattern reader, such as a radiologist, depresses the reporting pushbutton (not shown) provided on the reporting device 450 while viewing the images display outputted to the image output device 440, then the entire network 400 is shifted to the reporting function, which allows the desired information to be inputted to the reporting device 450.

As the reporting contents (reporting function), records (descriptions) are given for the three items, i.e., patient information, breast composition (brief description of overview of entire mammogram, detection result, and summary), and assessment categories in conformity with the above-stated BI-RADS reporting system proposed by the ACR. FIG. 3 shows a chart giving the items in detail for the reporting contents. The specific method for recording the contents for these three items is as follows:

(1) The patient information is automatically stored in the server 40 by the system 100 on the basis of the patient ID information, etc. included in the above supplementary information.

(2) The result of detection processing of the abnormal patterns (the existence of calcification) (the result of automatic detection processing) by the abnormal pattern detection processor means 30 is also automatically stored in the server 40 by the system 100, and when it is determined that abnormal pattern exists, the detected abnormal patterns are outputted to the image output device 440 in the layout as shown in FIG. 2 A or FIG. 2B together with the original image. In addition, not only the result of detection processing of whether or not abnormal pattern i.e., calcification exists, but also the other detection result items as shown in FIG. 3 and the contents are automatically stored in the server 40.

(3) The pattern reader (a radiologist or a clinician) makes pattern reading assessment of the output image from the image output device 440 to determine whether or not abnormal pattern exists, by referring to the result of detection processing by the abnormal pattern detection processor means 30 (as an assessment aid), and inputs the result. As the way of inputting the result, the displayed images which are determined to be abnormal patterns by the pattern reader are circled (are clicked) by use of the ROI. Alternatively, by using the reporting device 450, the correct result of automatic detection processing is left as it is, and when the abnormal pattern detection processor means 30 gives an erroneous result of detection processing, it can be cancelled and when the abnormal pattern detection processor means 30 cannot detect an abnormal pattern, it can be added.

The reporting device 450 determines whether the result of automatic detection processing by the abnormal pattern detection processor means 30 is correct or not, by using the inputted pattern reading assessment result as a criteria (the correct result). For example, when an abnormal pattern is erroneously detected as if it existed, an FP (False Positive) is given. When an abnormal pattern which actually occurs is correctly detected, a TP (True Positive) is given, and when an abnormal pattern which actually occurs is erroneously detected as if it did not exist, an FN (False Negative) is given. Also, when existence of no abnormal pattern is correctly determined, i.e., when there is no wrong detection, a TN (True Negative) is given. This result of determination (which is equivalent to the corrected result after correcting the result of automatic detection processing) is stored in the server 40.

(4) The pattern reader carries out pattern reading assessment of the output image from the image output device 440 to input the assessment category, the mammogram classification, and the comment in conformity with the BI-RADS from the reporting device 450. These input data are stored in the server 40.

Figure 4:
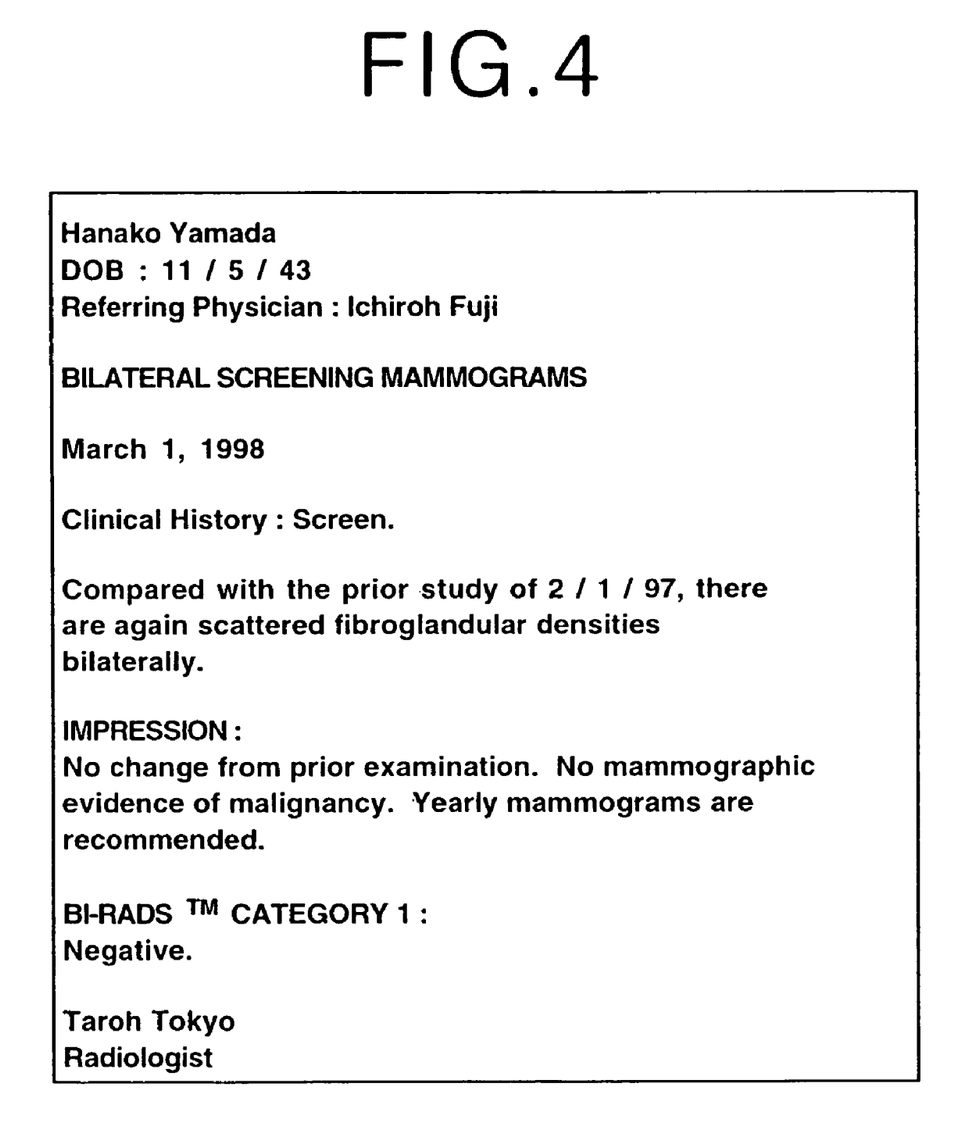
FIG. 4 is a chart giving an example of pattern reading report.

Thus, the pattern reading report of the patient information and the result of detection processing, as well as the assessment category, the mammogram classification, the comment, etc. as mentioned in the above paragraphs (1) to (4) (including the result of automatic detection processing by the abnormal pattern detection processor means 30) is stored in the format in conformity with the reporting content items as shown in FIG. 3 which conform to the BI-RADS. When the pattern reading report is stored in the server 40, it is converted into data which can be used with each particular patient. FIG. 4 shows an example of a pattern reading report.

(5) Besides this pattern reading report, the result of pathologic assessment (the result of final assessment) obtained from the actual assessment of the abnormal patterns or the candidate areas by the palpatory audit by a clinician, the affected part audit by use of a diagnostic needle, the biological method, such as blood test, or the like is also stored, being related to the pattern reading report.

Thus, by storing the information for a plurality of patients, a data base is constructed. In constructing such a database, the NMD method proposed by the ACR is adopted to record and store the contents of the 122 items (the detail is omitted).

The evaluator means 50 automatically performs the following statistical processing from the above-mentioned data base. In other words, from the data which is based on the above paragraphs (2) and (3), the algorithm detection rate and the algorithm erroneous detection rate for detection processing by the abnormal pattern detection processor means 30 are statistically calculated using the following formulas (in the following formulas, TP and other symbols denote the respective numbers of occurrences).

Algorithm detection rate=$TP/(TP+FN)$[%]

Algorithm erroneous detection rate=$FP$/total number of images [occurrences per image]

By thus finding the algorithm detection rate, etc. for detection processing, the performance of the algorithm for automatic detection processing can be quantitatively evaluated. The algorithm can also be improved based on this result.

From the data which is based on the individual assessment categories in the above paragraph (4) and the individual results of pathologic assessment in (5), the specificity and the cancer detection rate are calculated. In this case, because the reporting contents based on the BI-RADS reporting system are described, evaluation (statistical processing) in conformity with the follow-up method of the BI-RADS can be performed, and in this case, first from the data on the basis of the individual assessment categories and the individual results of pathologic assessment, TP, FP, FN, and TN are determined, and then in accordance with the specified formats (FORM A and FORM B), the sensitivity, the specificity, etc. can be determined.

Figure 5:
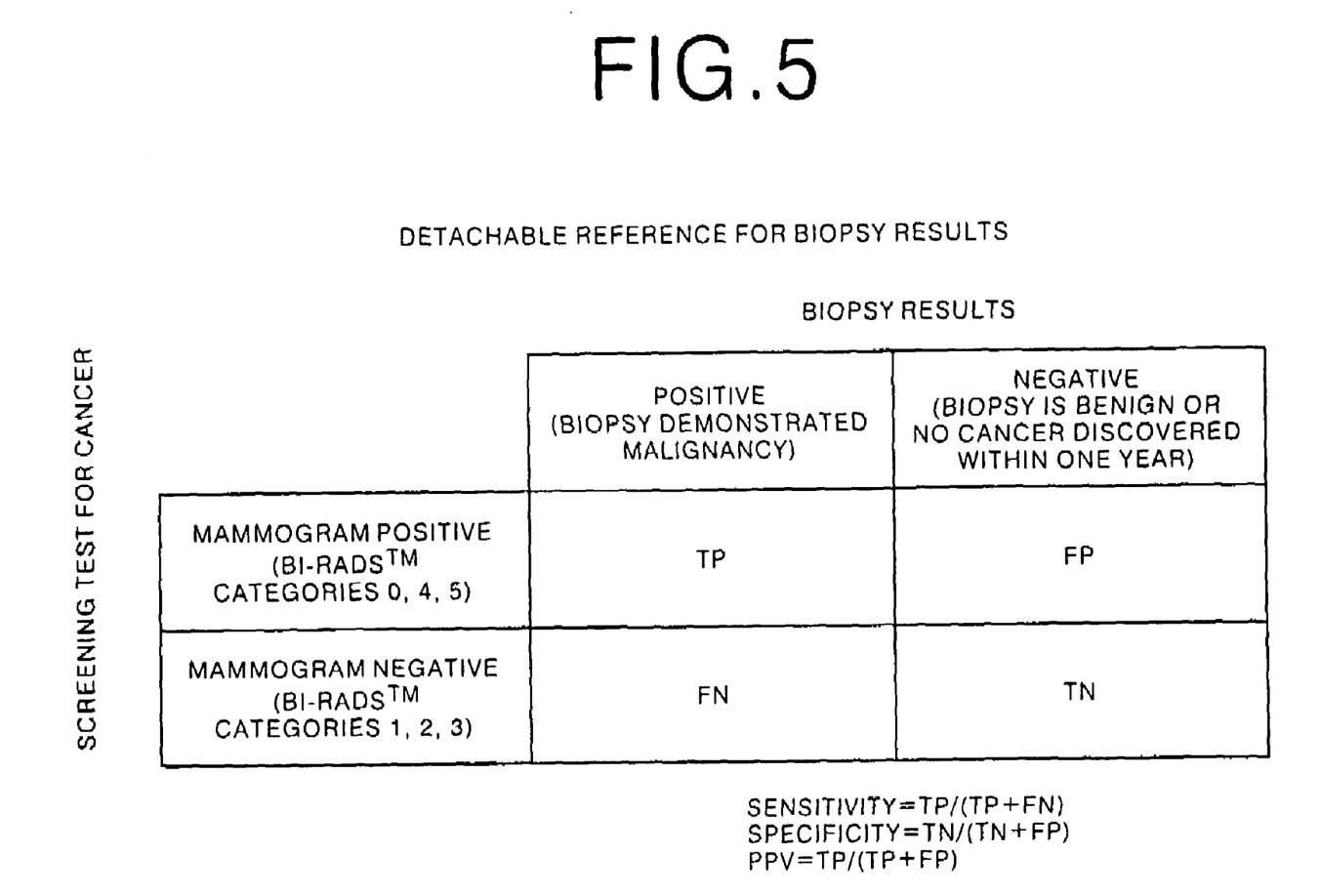
FIG. 5 is a chart illustrating the method for giving a TP, FP, FN, or TN on the basis of the assessment category and the pathologic assessment result, and providing the formulas to find the sensitivity, the specificity, and the value of PPV on the basis of the number of occurrences of TP, FP, FN, and TN.
Figure 6:
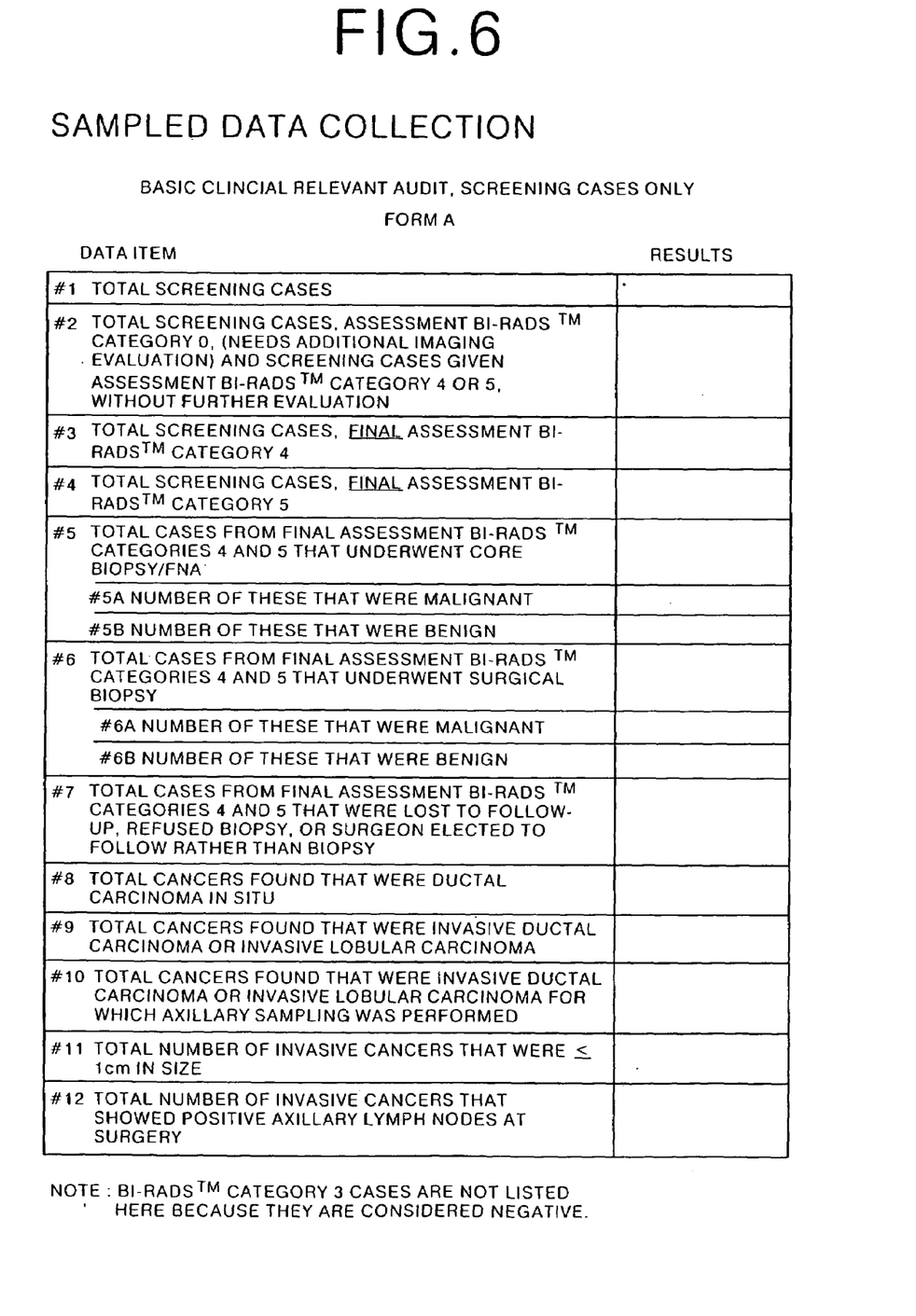
FIG. 6 is a chart giving an example of format for statistical processing (FORM A)

The method for giving TP, FP, FN, or TN on the basis of the assessment category and the result of pathologic assessment, and the formulas to find the sensitivity, the specificity, and the PPV (Positive Predictive Value) on the basis of the numbers of occurrences of TP, FP, FN, and TN are given in FIG. 5. FIG. 6 gives an example of FORM A, FIG. 7 gives an example of FORM B, and FIG. 8 gives an example of result of processing on the basis of FORM A and FORM B.

As shown in FIG. 5, with the follow-up method of the BI-RADS, the assessment category for the result of pattern reading assessment is compared with the result of pathologic assessment by biopsy, and by using the result of pathologic assessment as the criterion (the correct result), it is determined whether or not the result of pattern reading assessment is correct. For example, in the case where the result of pathologic assessment is "malignant", when the category is 0, 4, or 5 (which is equivalent to the result of pattern reading assessment being that an abnormal pattern exists, or the result being uncertain), TP is given, and when the category is 1, 2, or 3 (which is equivalent to the result of pattern reading assessment being that no abnormal pattern exists), FN is given, while, in the case where the result of pathologic assessment is "benign" or no cancer has been discovered within the last one year, when the category is 0, 4, or 5, FP is given, and when the category is 1, 2, or 3, TN is given. The sensitivity, the specificity, and the PPV can be found as follows on the basis of the numbers of occurrences of TP, FP, FN, and TN (in the following formulas, TP and other symbols denote the respective numbers of occurrences).

$Sensitivity = TP/(TP+FN)$ $Specificity = TN/(TN+FP)$ $PPV = TP/(TP+FP)$

Figure 7:
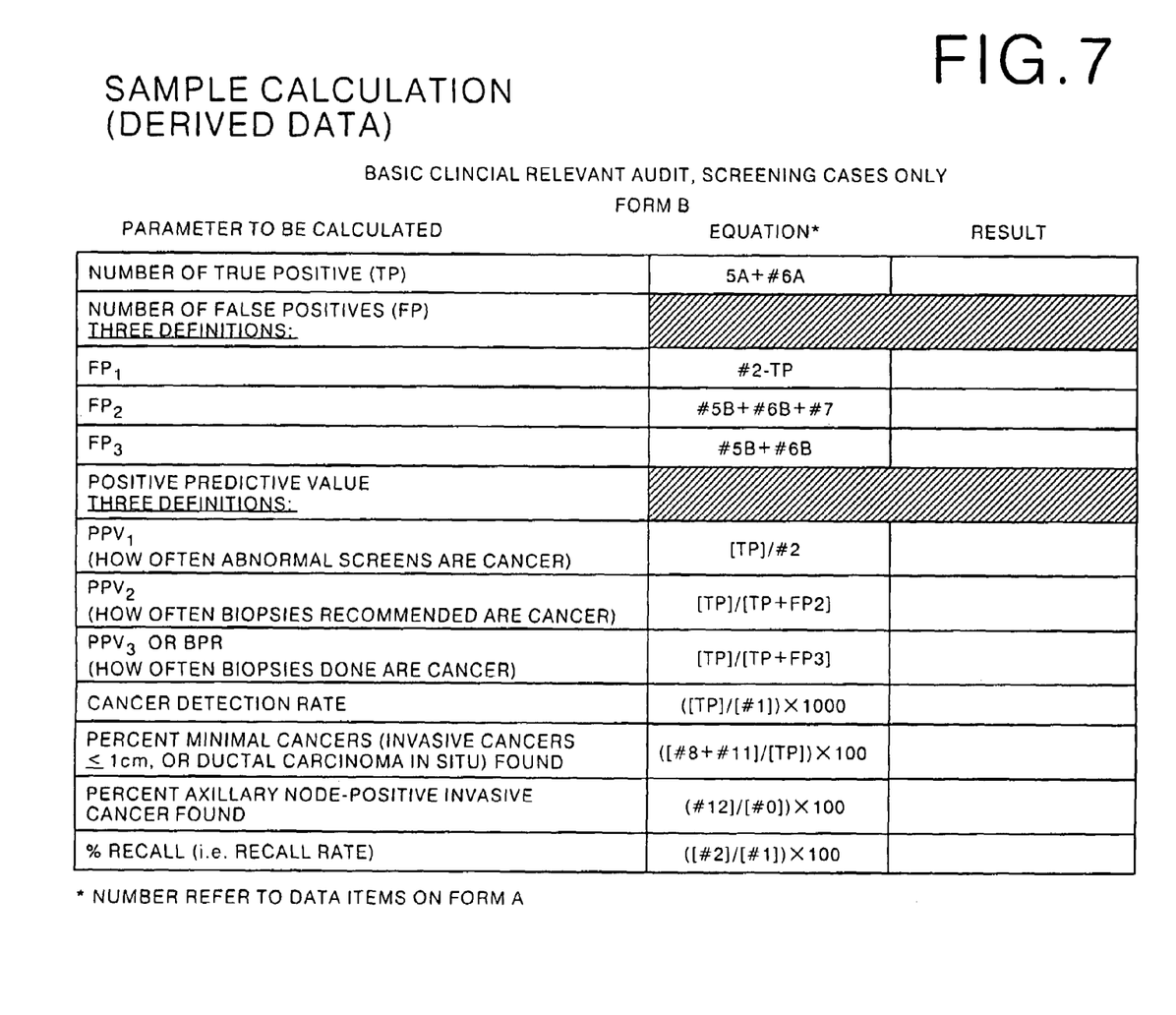
FIG. 7 is a chart giving an example of format for statistical processing (FORM B)
Figure 8:
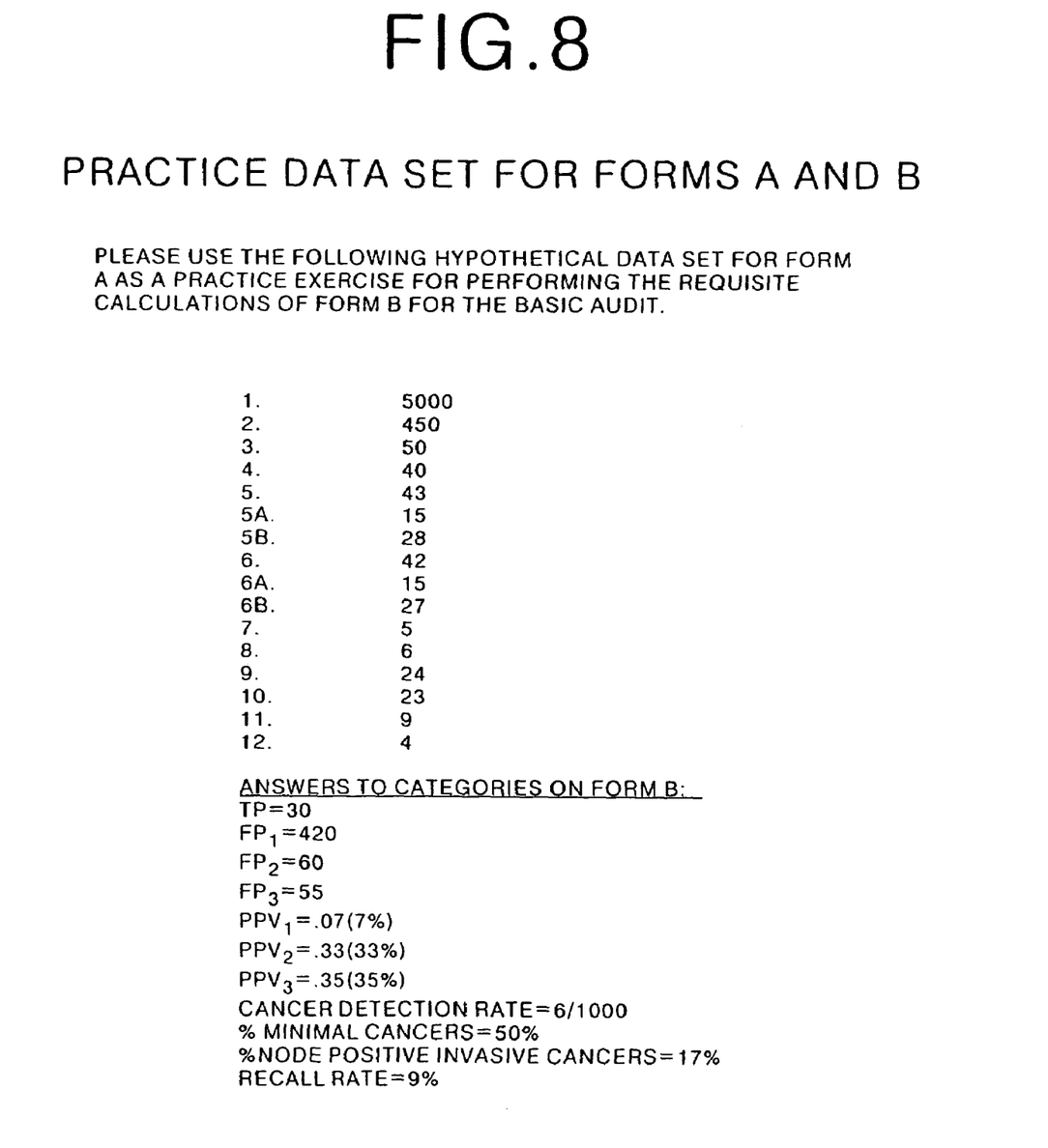
FIG. 8 is a chart giving an example of result of processing on the basis of FORM A and FORM B.

For the follow-up method of the BI-RADS, a technique which uses the numbers of occurrences of TP and others, and the DATA ITEM for classification of them to perform more detailed statistical processing as shown in FIG. 6 and FIG. 7 is provided. With this technique, the indexes other than the above-mentioned sensitivity, etc. (for example, cancer detection rate) can be obtained.

By thus finding the sensitivity, the specificity, etc., the performance of cancer assessment by a doctor or an institution can be known to obtain a guideline to a higher level of pattern reading.

Figure 9:
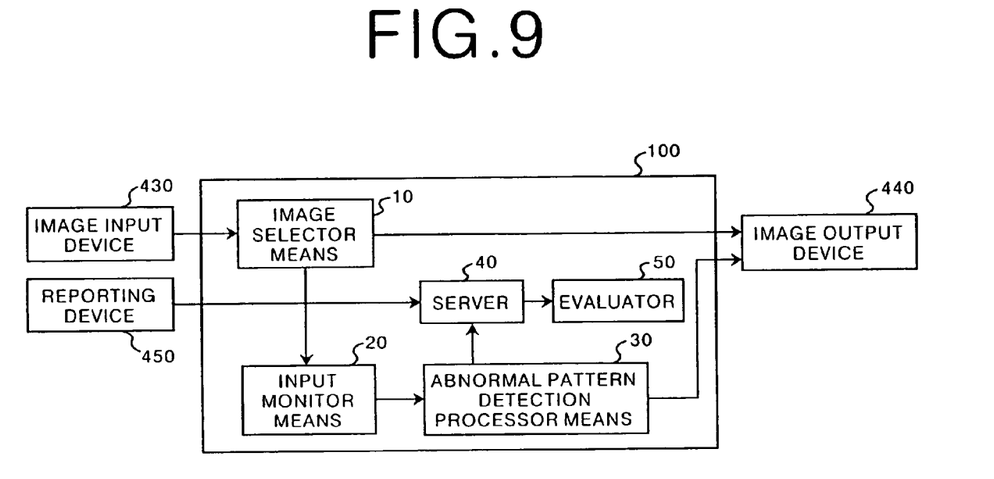
FIG. 9 is a diagram illustrating an embodiment (a style without network connection) of the abnormal pattern detection processing system of the present invention.

The abnormal pattern detection processing system of the above-stated embodiment has been explained on the assumption that it is configured as a system connected to the network. However, it can, of course, be constructed as an independent system which is not connected to the network. FIG. 9 is a block diagram illustrating an embodiment in which the above-stated abnormal pattern detection processing system 100 is constructed as an independent system. The abnormal pattern detection system 100 as shown in FIG. 9, as with the above-stated network-connected system, comprises image selector means 10, input monitor means 20, abnormal pattern detection processor means 30, a server 40, and evaluator means 50. An image input device 430 is connected to the image selector means 10, and an image output device 440 is connected to the image selector means 10 and the abnormal pattern detection processor means 30. A pattern reading report from a reporting device 450 is inputted to the server 40, as well as the result of detection processing by the abnormal pattern detection processor means 30, these being configured so as to be connected to the server 40. The functions of this abnormal pattern detection system 100 are the same as those of the above-stated system which is connected to the network, thus detailed explanation of them is omitted.

With the abnormal pattern detection processing system of the above-stated embodiment, it is assumed that the image selector means selects only the mammograms to output them to the input monitor means, but with the abnormal pattern detection processing system of the present invention, the image information to be selected is not limited to mammograms, and various types of image information, such as chest image information, can be selected, provided that the image information to be selected is an object of abnormal pattern detection processing, and it is made up of a plurality of items of image information which are different from each other because they differ in the direction of screening, etc., but which form one set screened for the same subject.

The input monitor means may be provided with means having a function with which, when, within the previously set time from the moment at which the first item of image information for a particular patient is inputted, the input of all the other items of image information concerning the same subject as that represented by the first item of image information for the patient has not been detected, the input of all the items of image information is regarded as detected. Only the items of abnormal pattern detection processing object image information which have been inputted are collectively inputted to the abnormal pattern detection processor means, so that the likelihood of it never being possible to input the image information which is an object of abnormal pattern detection processing to the abnormal pattern detection processor means, when one or more of the items of image information to provide a set is never inputted for some reason, can be eliminated.

The abnormal pattern detection processing system of the above-stated embodiment has been explained on the assumption that, when the abnormal pattern detection processor means 30 performs detection processing and determines that an abnormal pattern exists, an image of the affected part zone including the abnormal pattern is outputted to the image output device. However, the image of the affected part zone need not always be displayed so long as the abnormal pattern in the image represented by the image information is detected and processed on the basis of the inputted image information.

The above-stated embodiment has been explained on the assumption that the abnormal pattern detection processing method and system according to the present invention is used for medical assessment application. However, the scope of application for the present invention is not limited to medical assessment application, but can also be applied to radiation assessment devices for non-destructive inspection.

As described above in detail, with the abnormal pattern detection processing method and system according to the present invention, by combining the reporting system with the abnormal pattern detection processing system and relating the result of detection by the abnormal pattern detection processing system to the pattern reading report, etc., the pattern reader (such as a doctor) can check for the performance of assessment (the specificity) and the sensitivity, use the pattern reading report for improvement of the detection processing algorithm, and as a result, can perform pattern reading at a higher level and contribute to improvement of the performance of assessment.

What is claimed is:

1. An abnormal pattern detection processing method comprising:
   detecting an abnormal pattern in an image, based on inputted image information;
   processing the detected abnormal pattern;
   displaying the detected abnormal pattern;
   correcting the processed and displayed abnormal pattern, for each of a plurality of items of the inputted image information;
   relating a result of the processed and displayed abnormal pattern to a result of the corrected abnormal pattern, for each of the plurality of items of the inputted image information, for each patient; and
   storing the plurality of processed abnormal pattern results and the plurality of corrected abnormal pattern results for each patient, wherein
   said correcting step includes canceling a pattern which is not abnormal within the processed and displayed abnormal pattern, and adding an abnormal pattern which was not detected by the abnormal pattern detection; and
   said relating step includes determining a cancelled abnormal pattern as an FP, a non-cancelled abnormal pattern as a TP, and an added abnormal pattern as an FN.

2. An abnormal pattern detection processing method according to claim 1, wherein quantitative evaluation of the detection processing is performed, on the basis of said stored plurality of processed abnormal pattern results and said stored plurality of corrected abnormal pattern results.

3. The method of claim 2, wherein the corrected abnormal pattern results comprise a determination of whether the processed abnormal pattern corresponds to at least one of a true positive, false positive, true negative and false negative.

4. The method of claim 3, wherein the quantitative evaluation comprises a ratio of a number of true results relative to a number of true and false results.

5. The method of claim 4, wherein a sensitivity of the quantitative evaluation is determined by the ratio of true positives to a sum of true positives and false negatives.

6. The method of claim 4, wherein a specificity of the quantitative evaluation is determined by the ratio of true negatives to a sum of true negatives and false positives.

7. The method of claim 4, wherein a positive predictive value of the quantitative evaluation is determined by the ratio of true positives to a sum of true positives and false positives.

8. An abnormal pattern detection processing method according to claim 1, wherein the processing automatically determines whether the abnormal pattern exists or not, based on a result of the detection of said abnormal pattern in said image.

* * * * *